US006267006B1

(12) United States Patent
Bugli et al.

(10) Patent No.: US 6,267,006 B1
(45) Date of Patent: Jul. 31, 2001

(54) AIR INDUCTION ASSEMBLY FOR A MASS AIR FLOW SENSOR

(75) Inventors: Neville Jimmy Bugli, Novi; Dale Edward Owings, Livonia; Jayanthi Iyer, Ypsilanti; Roger Khami, Troy; Laura Lou Cranmer, Novi, all of MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 08/953,655

(22) Filed: Oct. 17, 1997

(51) Int. Cl.[7] ..................................................... F02D 41/18
(52) U.S. Cl. ...................................... 73/118.2; 73/861.63
(58) Field of Search ............................. 73/118.2, 861.22, 73/195, 861.63, 861.64

(56) References Cited

U.S. PATENT DOCUMENTS

| 4,036,054 | 7/1977 | Goulet . | |
|---|---|---|---|
| 4,228,768 | 10/1980 | Kita . | |
| 4,304,129 | * 12/1981 | Kawai et al. ........................ | 73/118.2 |
| 4,397,192 | 8/1983 | Mollet . | |
| 4,576,043 | * 3/1986 | Nguyen .................................. | 73/195 |
| 4,602,514 | 7/1986 | Kurrle et al. . | |
| 4,729,776 | 3/1988 | Elliff . | |
| 4,774,833 | * 10/1988 | Weibler et al. ..................... | 73/118.2 |
| 4,821,700 | * 4/1989 | Weibler et al. ..................... | 73/118.2 |
| 5,029,465 | * 7/1991 | Tanimura et al. ................... | 73/118.2 |
| 5,052,229 | * 10/1991 | Tanimura et al. ............... | 73/861.22 |
| 5,253,517 | * 10/1993 | Molin et al. ........................ | 73/118.2 |
| 5,383,356 | 1/1995 | Zurek et al. . | |
| 5,476,012 | 12/1995 | Takashima . | |
| 5,481,925 | 1/1996 | Woodbury . | |
| 5,546,794 | * 8/1996 | Kuhn et al. ......................... | 73/118.2 |
| 5,595,157 | 1/1997 | Siew et al. . | |

* cited by examiner

*Primary Examiner*—Eric S. McCall
(74) *Attorney, Agent, or Firm*—MacMillan, Sobanski & Todd, LLC

(57) ABSTRACT

An air induction assembly 10 disposed in an intake passage through which air flows to an engine. The air induction assembly 10 has a conduit member 20 which defines an air flow path. A mass air flow sensor (MAFS) 30 is located in the intermediate conduit portion and is in fluid communication with the air flow path. The MAFS 30 being operative to generate an output signal corresponding to air flow rate within the intermediate conduit portion A plurality of flow conditioning elements (FCEs) 22 in the airflow path produce a uniform airflow with low turbulent fluctuations to the MAFS 30 under all vehicle and engine speeds without excessively restricting the air flowing to the engine.

6 Claims, 4 Drawing Sheets

AIR INDUCTION ASSEMBLY FOR A MASS AIR FLOW SENSOR

BACKGROUND OF THE INVENTION

1. Field of the Invention

The instant invention relates to an air induction assembly disposed in an intake passage through which air flows to an internal combustion engine. More specifically, the instant invention relates to the use of a plurality of flow conditioning elements to produce a uniform airflow with low turbulent fluctuations to the mass air flow sensor under all vehicle and engine speeds.

2. Description of the Related Art

It is known to those skilled in the art to use a mass air flow sensor, including those of the hot wire or hot film anemometry type, to measure the air flow rate entering an engine. The mass air flow sensor (MAFS) outputs an analog voltage signal that corresponds to the mass of air flowing through the air induction system. The output from the MAFS is used to maintain the desired air-fuel ratio so that performance, fuel economy and emission targets are met.

To provide an accurate indication of airflow, the MAFS must receive airflow of uniform velocity having a low magnitude of turbulent fluctuations over all engine and vehicle speeds. Airflow will exhibit some measure of turbulence and that turbulence can be described as the average fluctuation of the fluid from its average velocity.

When airflow having a high magnitude of turbulent fluctuations is presented to the MAFS, noise is created in the MAFS output signal as a direct indication of the airflow turbulence variation entering the MAFS. Much of this turbulence variation is caused from the ever present pulsation from the engine valve train and pistons. The pulsation creates signal noise which is particularly influential at low engine rpm.

Further, as with any fluid flow through a conduit, there is a considerable difference in the velocity between the airflow near the inner surface of the air induction duct and the airflow near the center of the air induction duct. This variation in velocity may be described as a parabola-like profile defining the relative velocity of the airflow within the air induction duct. The apex points downstream and the amplitude depends on the input velocity of the airflow. These airflow variations combine to increase fluctuations in the area adjacent to the MAFS, preventing consistent accurate measurements.

It is known to reduce the magnitude of the airflow turbulence variation by providing the air induction system with an air flow uniforming device upstream of the mass air sensor. Mollet, U.S. Pat. No. 4,397,192, teaches a mesh structure disposed within the air induction conduit perpendicular to the direction of the fluid flow and upstream from a sensor to provide a reduction in the oscillating air flow turbulence and provide a uniform flow of air across the sensor. However, as the mesh structure is disposed over the entire air induction conduit there is a corresponding restriction in the airflow which may pass through the mesh structure and to the engine. This decrease in airflow translates into a decrease in engine horsepower. Further, in addition to increased cost, the mesh structure may collect debris, corrode, or freeze, all of which again further restrict airflow and therefor engine horsepower.

It is further known to dispose within an air intake duct a swirl generating means with an air flow sensor mounted thereon. Takashima, U.S. Pat. No. 5,476,012, teaches a cone axially supported in the center of an air intake duct by guide vanes attached to the inner surface of the duct. Fixed to the downstream portion of the cone is the air flow sensor. The guide vanes are operative to swirl the air in cooperation with the cone.

The assembly taught by Takashima has the disadvantages of being difficult to fabricate and restricting the airflow provided to the engine. Further, as the airflow is swirling, the axial velocity of the airflow is reduced. The restricted and reduced velocity airflow therefor cause a corresponding decrease in engine horsepower. The instant invention provides uniform airflow with minimum restriction to the MAFS over all engine and vehicle speeds and does not generate a swirl therein. Further, the instant invention provides a structure which only partially extends into the airflow duct. This allows the manufacture of a simple and cost effective one piece design without the need for costly tooling.

Other variations of an airflow sensor supported in the air duct are taught by Woddbury, U.S. Pat. No. 5,481,925, and Kurrle, U.S. Pat. No. 4,602,515. Both of these references add the complexity of using the airflow sensor support members as airflow collecting pipes. The airflow sensor is not directly in the airflow path but is provided with airflow samples from the independent collecting pipes. The airflow is sampled over the cross section of the duct, and then travels radially inwardly to the centrally mounted airflow sensor pod. The airflow is therefor not conditioned prior to being provided to the air flow sensor located within the airflow path, but simply collected and fed to the air flow sensor.

It is desirable to create an airflow that has a uniform velocity and a low magnitude of turbulent fluctuations. It is further desirable to produce an air induction assembly that does not restrict the central portion of the air intake duct preventing a decrease in engine horsepower.

SUMMARY OF THE INVENTION

Responsive to the disadvantages of the prior art, the instant invention provides an air induction assembly with flow conditioning elements which reduce the magnitude of airflow turbulence variation entering the MAFS while providing a negligible restriction of airflow to the engine.

The air induction assembly provides a conduit member which has an upstream portion, a downstream portion and a intermediate portion therebetween. The conduit defines an air flow path between the upstream conduit portion to the downstream conduit portion. The conduit member may be further shaped as a venturi to provide for the air flow path. A MAFS is located in the intermediate conduit portion and is placed in fluid communication with the air flow path. The MAFS being operative to generate an output signal corresponding to the volumetric air flow rate within the intermediate conduit portion. A plurality of flow conditioning elements in the air flow path upstream of the mass air flow sensor direct airflow of uniform velocity and low magnitude of turbulent fluctuations to the mass air flow sensor. The uniform airflow is provided under all vehicle and engine speeds without excessively restricting the air flowing to the engine.

Each flow conditioning element partially extends inwardly from the conduit members inner surface towards the conduit member axial centerline. The plurality of flow conditioning elements may be circumferentially arrayed on a plate attached to the conduit member or integrally formed on the conduit members inner surface. The flow conditioning elements need only be in fluid communication with the air flow path and positioned upstream of the mass air flow sensor.

According to one embodiment of the instant invention, the conduit member consists of a plurality of sections. One section being a filter support plate providing integrally molded flow conditioning elements in fluid communication with the air flow path. In another embodiment of the instant invention, the air induction assembly is located downstream of a filter element and contained within a protective housing.

Another embodiment of the invention provides for the flow conditioning elements to be integrally formed on the inner surface of the conduit member thus providing a light weight, low cost, simple to produce member.

Accordingly, an object of the instant invention is to provide an air induction system which provides a repeatable turbulent and uniform air flow to the MAFS under all vehicle and engine speeds. Another object of the instant invention is to eliminate any structure from the central portion of the air intake duct, and thus preventing a corresponding decrease in engine horsepower.

An advantage of the instant invention is the use of flow conditioning elements which reduce the magnitude of airflow turbulence entering the MAFS while providing minimum restriction of airflow to the engine.

These and other desired objects of the instant invention will become more apparent in the course of the following detailed description and appended claims. The invention may best be understood with reference to the accompanying drawings wherein illustrative embodiments are shown.

DETAILED DESCRIPTION OF THE PREFERRED EMBODIMENTS

Figure 1:
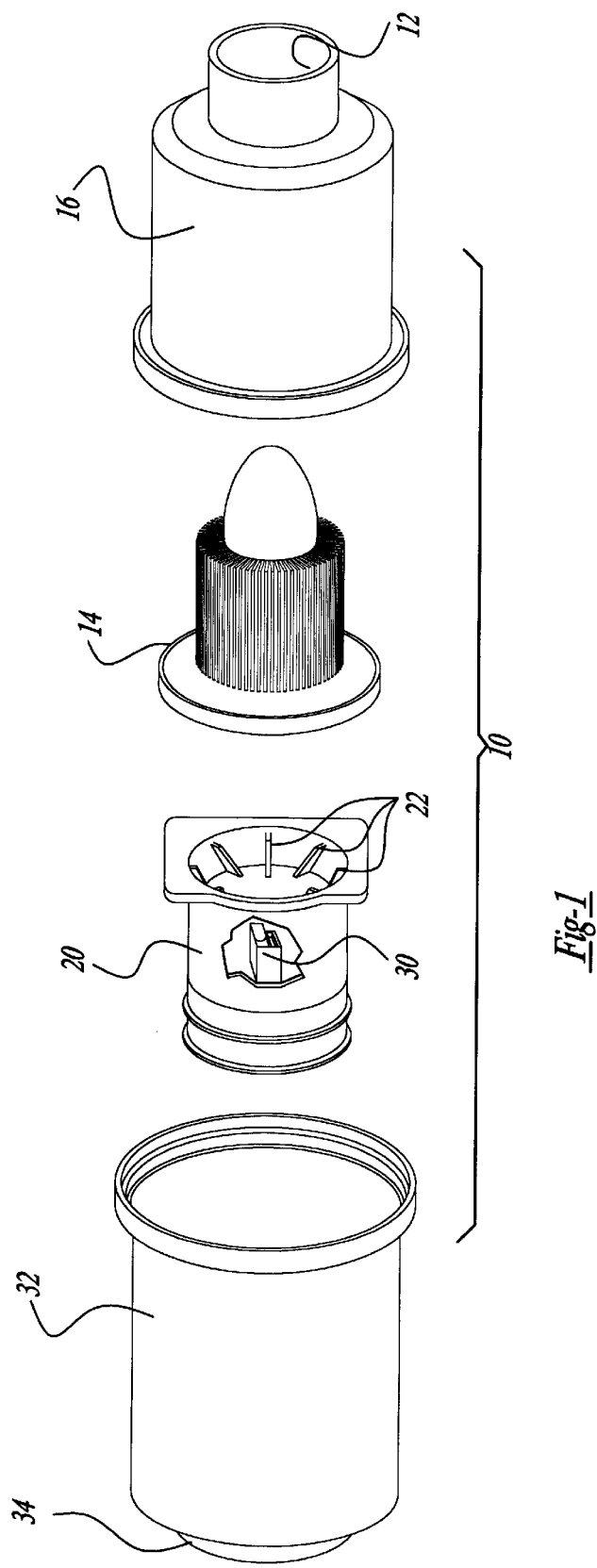
FIG. 1 is an exploded perspective view of an air induction assembly according to the instant invention.

The instant invention will be described through a series of drawings, which illustrates the air induction assembly of the instant invention. Referring to FIG. 1, there is shown an air induction assembly 10 of the instant invention. The air entrance port 12 is directly or indirectly in fluid communication with air flow from the air intake (not shown) so that ambient air is introduced into the air induction assembly 10. After entry to the air entrance port 12, the ambient air is filtered by a filter element 14. The filter element 14 is of cylindrical cross-section or of planar cross-section depending on the applicable air induction assembly 10. The filter element 14 is further contained within, and protected by, a filter housing 16. After passing through the filter element 14, the airflow enters the conduit member 20. The airflow there encounters a plurality of Flow Conditioning Elements (FCEs) 22 arrayed in fluid communication with the airflow path. As will be described in greater detail, the FCEs 22 shape the airflow pattern presented to the Mass Air Flow Sensor (MAFS) 30 to provide an airflow of uniform velocity with a low magnitude of turbulence fluctuations. The conduit member 20 is further contained within, and protected by, a conduit housing 32. The aiflow thereafter exits the air induction assembly 10 through an exit port 34 in the conduit housing 32.

Figure 2:
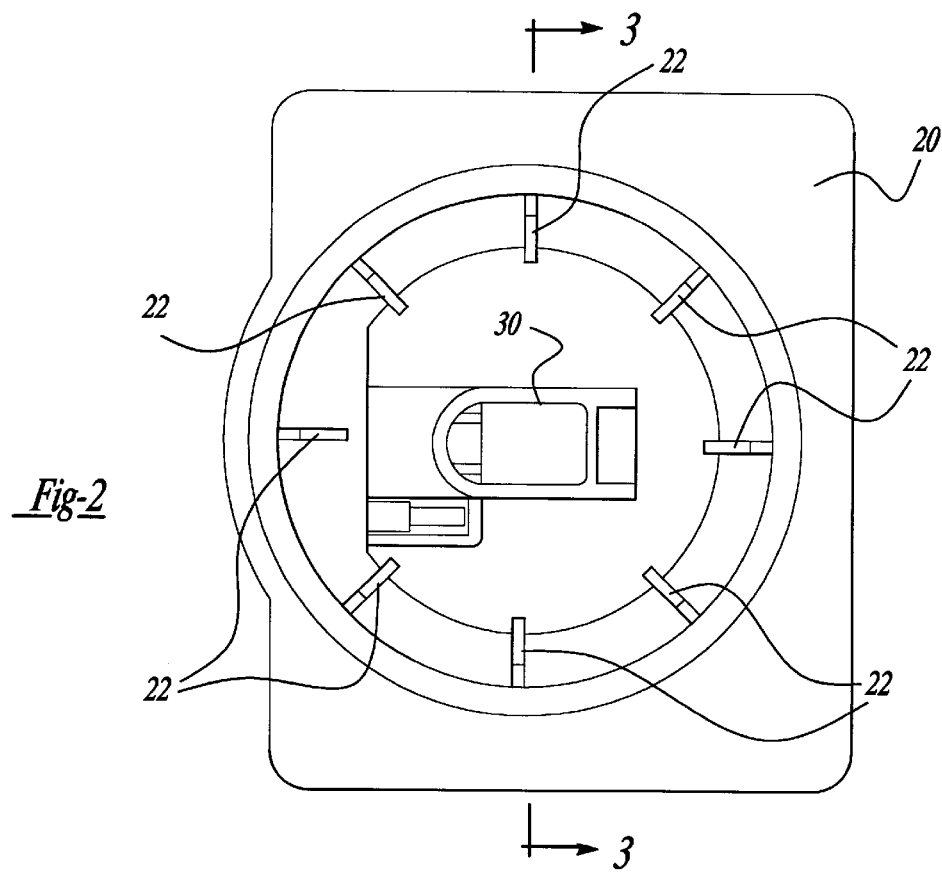
FIG. 2 is a frontal view, of the conduit member.
Figure 3:
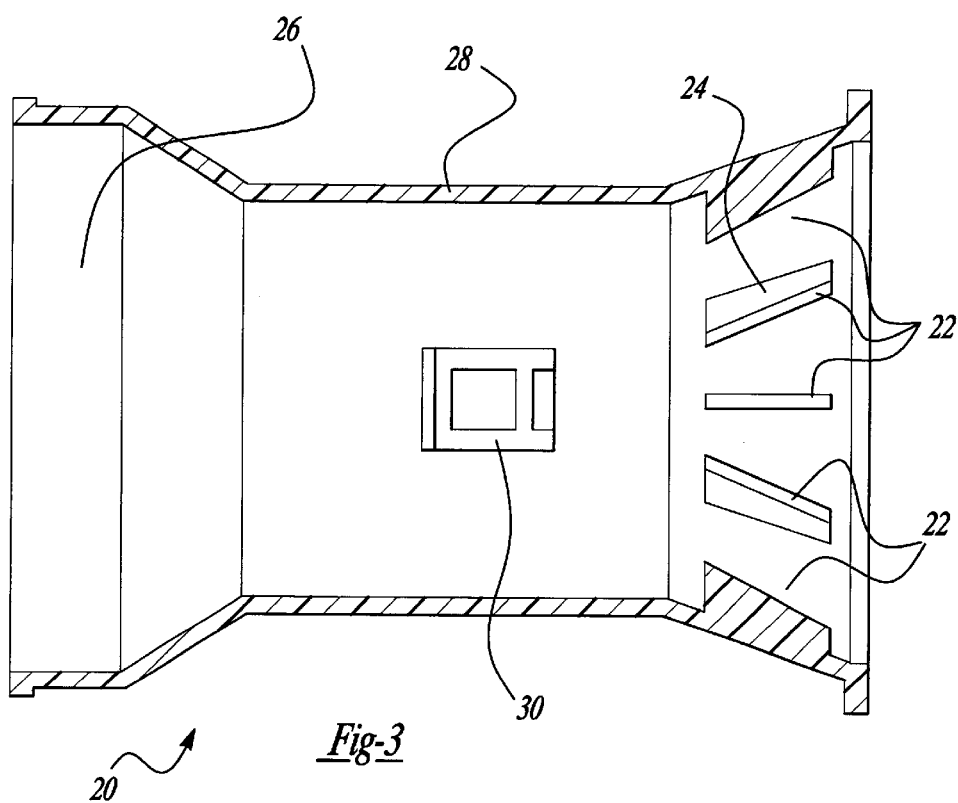
FIG. 3 is an enlarged cross-sectional view of the conduit member taken through line 3—3 as shown in FIG. 2.

The cross-sectional view of the conduit member 20 in FIG. 3 is taken along the line 3—3 in FIG. 2. The conduit member 20 comprises one or more sections having an upstream conduit portion 24 and a downstream conduit portion 26 with an intermediate conduit portion 28 therebetween. The upstream conduit portion 24 of the conduit member 20 is in fluid communication with airflow from the air intake (not shown) in the figure which may be earlier filtered by a filter element 14. The MAFS 30 is attached to the intermediate conduit portion 28 of the conduit member 20. The MAFS 30 within the conduit member 20 and is in fluid communication with the airflow path between the upstream conduit portion 24 and the downstream conduit portion 26. The conduit member 20 is preferably formed so as to comprise a venturi having an inner diameter at the intermediate conduit portion 28 that is less than the inner diameter at either the upstream conduit portion 24 and the downstream conduit portion 26.

A computational fluid dynamics (CFD) software tool such as FLUENT/UNS published by Fluent Incorporated is first used to model the airflow pattern. An uninhibited conduit of the same dimensions as conduit member 20, but without FCEs, is used to determine this initial airflow pattern. This initial airflow pattern is then used as the baseline.

The next step is to determine the desired target airflow pattern. The target airflow pattern provides a desired reduction in the magnitude of airflow turbulence and a uniform airflow velocity within a conduit. One well understood, and commonly used device that provides an acceptable starting point for the target airflow pattern is a mesh structure. An expedient means to simulate the target airflow pattern is therefor with a CFD model of a mesh structure disposed within the CFD model of the uninhibited conduit.

The CFD program simulates the mesh structure as a pressure drop across a plane. This simulated mesh structure is inserted within the conduit member 20, perpendicular to the direction of the airflow and upstream from the MAFS 30. The CFD program is then used to again model the airflow pattern received by the MAFS 30. This provides the target airflow pattern as defined by velocity magnitude contours and turbulent kinetic energy contours for comparison to the baseline airflow pattern.

The CFD model of the baseline conduit member 20 is next altered to include a plurality of FCEs 22. The flow conditioned airflow pattern is determined by the CFD program and compared to the baseline airflow pattern. The exact parameters of the FCEs 22 are then further optimized to approach the target airflow pattern.

The disposition of the FCEs 22 are further shown in FIG. 2, a frontal view looking down-stream through the conduit member 20. The FCEs 22 are located on the inner wall of the upstream conduit portion 24 of the conduit member 20 and partially extend toward the conduit member's 20 axial centerline so that the center portion of the conduit member 20 remains unobstructed. The FCEs 22 partially extend radially inward so that they are in fluid communication with the airflow path. The FCEs 22 may be further arrayed circumferentially or in another disposition depending on the desired target airflow pattern. To further optimize the airflow pattern directed to the MAFS 30 at least one flow conditioning element should be positioned on a linear airflow path to the mass air flow sensor.

An example of a specific FCE 22 array for a 3.8 L engine and a 70.0 mm MAFS is: 8 FCEs spaced equidistant around the inner entrance perimeter of a 78.0 mm conduit having the first FCE on a linear airflow path to MAFS. Each FCE being 1.5 mm wide, 33.0 mm in length, 3.65 mm high at the upstream portion and 7.30 mm high at the downstream portion.

Figure 4:
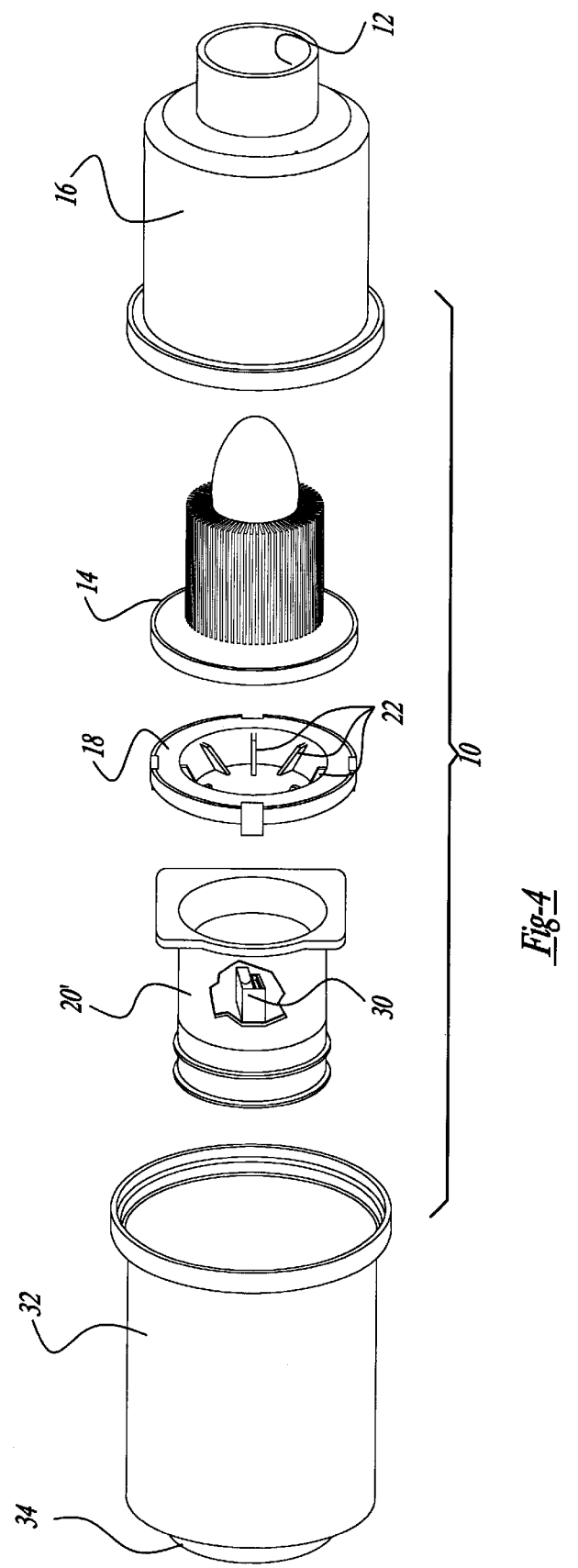
FIG. 4 is a perspective view of an alternate embodiment of an air induction assembly showing the use of a two piece conduit member.

FIG. 4 is a perspective view of an alternate embodiment of an air induction assembly 10' having a removably secured section of a conduit member 20', here shown as a filter support plate 18. Here the FCEs 22 are integrally molded on inner surface of the filter support plate 18 and not on the conduit member 20'. This provides the advantage of a light weight, low cost, simple to manufacture section which may be added to an existing air induction system.

Figure 5:
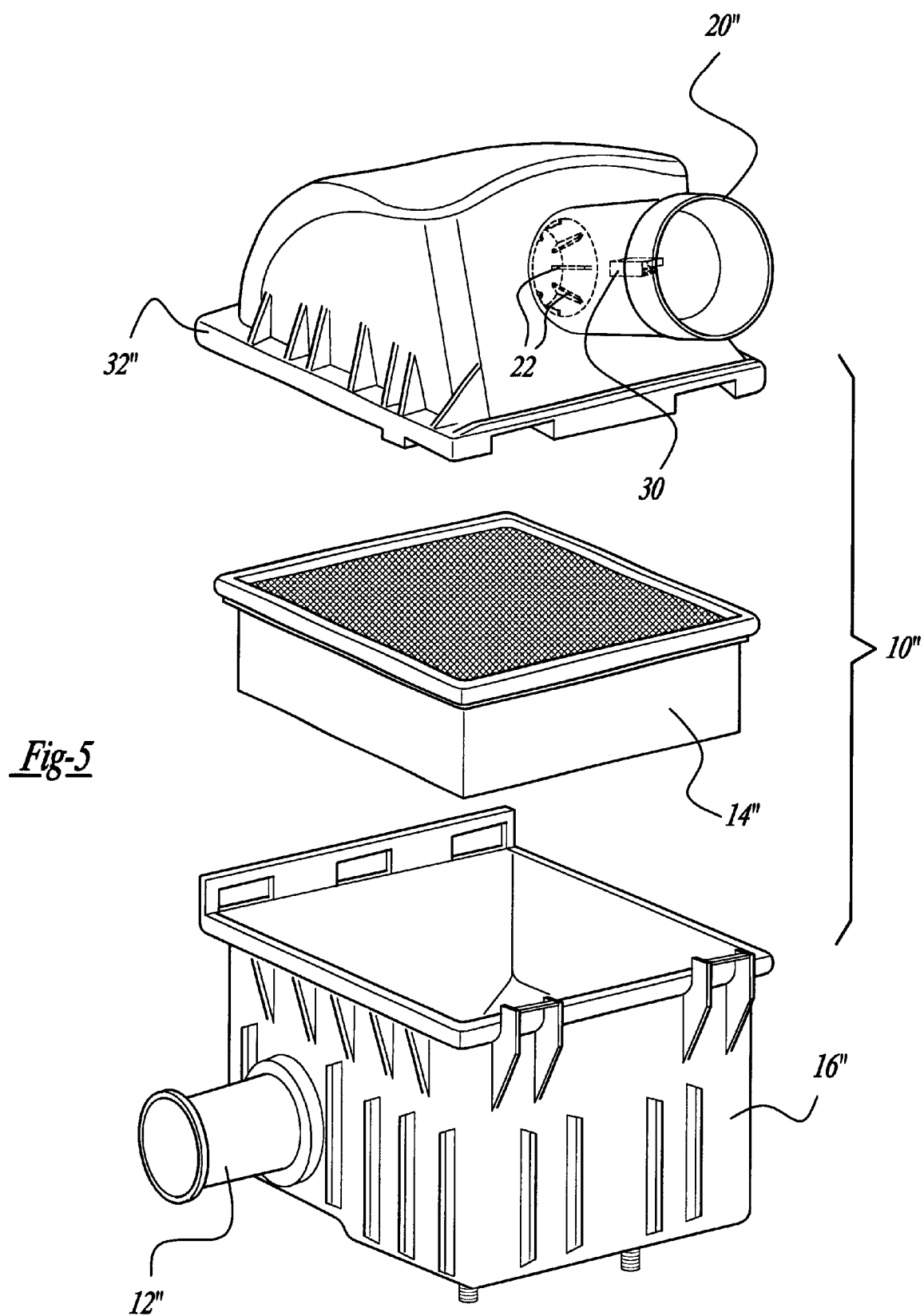
FIG. 5 is a perspective view partially broken away of yet another alternate embodiment of an air induction assembly with the use of a planar filter element.

FIG. 5 is a perspective view of yet another alternate embodiment of an air induction assembly 10" having a planar filter element 14". The secondary embodiment is substantially the same as the embodiment shown in FIG. 1 but having the conduit member 20" external of the conduit housing 32".

It is thus seen that the objects of this invention have been fully and effectively accomplished. It will be realized, however, that the foregoing preferred embodiments have been shown and described for the purpose of illustrating the functional and structural principles of this invention and are subject to change and modification by those skilled in the art without departing from the principles described. Therefore, this invention includes all modifications encompassed within the spirit and scope of the following claims:

What is claimed:

1. An air induction assembly through which air flows to an engine, said air induction assembly comprising:
   a conduit member having an axial centerline, an interior wall, an upstream portion, a downstream portion and an intermediate portion therebetween, said conduit defining a venturi having an inner diameter at said intermediate portion that is less than the inner diameter at said upstream portion and said downstream portion, wherein said conduit member defines an air flow path from said upstream portion, through said intermediate portion, exiting said downstream portion;
   a mass air flow sensor extending radially inward from said interior wall in fluid communication with said air flow path through said intermediate portion, said mass air flow sensor being operative to measure the rate of air flow to said engine; and
   a plurality of flow conditioning elements carried in said air flow path upstream of said mass air flow sensor, wherein said plurality of flow conditioning elements partially extend radially inward toward said axial centerline from said interior wall and have at least one flow conditioning element positioned axially upstream of said mass air flow sensor, said plurality of flow conditioning elements being operative to direct a uniform airflow having low turbulent fluctuation toward said mass air flow sensor.

2. An air induction assembly through which air flows to an engine, said air induction assembly comprising:
   a conduit member having an axial centerline, an interior wall, an upstream portion, a downstream portion an intermediate portion there between, wherein said conduit member defines an air flow path from said upstream portion, through said intermediate portion, exiting said downstream portion;
   a mass air flow sensor extending radially inward from said interior wall in fluid communication with said air flow path through said intermediate portion, said mass air flow sensor being operative to measure the rate of air flow to said engine; and
   a plurality of flow conditioning elements carried in said air flow path upstream of said mass air flow sensor, wherein said plurality of flow conditioning elements partially extend radially inward toward said axial centerline from said interior wall and have at least one flow conditioning element positioned axially upstream of said mass air flow sensor, said flow conditioning elements having an upstream end, a downstream end, and an angled top portion, wherein said flow conditioning elements have a greater width at said downstream end than at said upstream end, and wherein said top portion has a greater height at said downstream end than at said upstream end, said plurality of flow conditioning elements being operative to direct a uniform airflow having low turbulent fluctuation toward said mass air flow sensor.

3. The air induction assembly of claim 1, further comprising:
   a filter element positioned upstream of said conduit member;
   a filter housing having an air entrance port, wherein said filter housing contains said filter element; and
   a conduit housing having an exhaust port, wherein said conduit housing contains said conduit member, and said conduit housing is removebly secured to said filter housing member.

4. An air induction assembly through which air flows to an engine, said air induction assembly comprising:
   a conduit member having an axial centerline, an interior wall, an upstream portion, a downstream portion an intermediate portion therebetween and a filter support portion, said filter support portion upstream of said upstream portion, said conduit member having a venturi forming part of said conduit wherein the inner diameter of said intermediate portion is less than the inner diameter of said upstream portion and said downstream portion, wherein said conduit member defines an air flow path from said filter support portion, through said upstream portion, through said intermediate portion, and exiting said downstream portion;
   a mass air flow sensor extending radially inward from said interior wall in fluid communication with said air flow path through said intermediate portion, said mass air flow sensor being operative to measure the rate of air flow to said engine;
   a plurality of flow conditioning elements circumferentially arrayed and integrally molded within said filter support portion in said air flow path upstream of said mass air flow sensor, wherein said flow conditioning elements each have an upstream end, a downstream end and a top portion, wherein said flow conditioning elements each have a greater width at said downstream end than at said upstream end, and with said top portion defining an acute angle with respect to said air flow path and having a greater width at said downstream end than at said upstream end, wherein said plurality of flow conditioning elements partially extend radially inward toward said axial centerline from said interior wall and having at least one flow conditioning element positioned axially upstream of said mass air flow sensor, said plurality of flow conditioning elements being operative to direct a uniform airflow having low turbulent fluctuation toward said mass air flow sensor; and a filter element positioned upstream of said filter support portion of said conduit member.

5. The air induction assembly of claim 4, wherein said filter support portion is fixedly attached to said upstream portion of said conduit member.

6. The air induction assembly of claim 4, wherein said filter support portion and said conduit member are one piece.

* * * * *